(12) United States Patent
Arao et al.

(10) Patent No.: US 7,205,042 B2
(45) Date of Patent: Apr. 17, 2007

(54) LAMINATE FOR USE IN ARMOR OF CELL, AND SECONDARY CELL

(75) Inventors: Hideki Arao, Tokyo (JP); Koichi Mikami, Tokyo (JP); Takakazu Goto, Tokyo (JP); Kazuya Tanaka, Tokyo (JP); Akio Shimizu, Tokyo (JP); Ryoji Morita, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 214 days.

(21) Appl. No.: 10/466,738

(22) PCT Filed: Feb. 6, 2002

(86) PCT No.: PCT/JP02/00966

§ 371 (c)(1),
(2), (4) Date: Jul. 18, 2003

(87) PCT Pub. No.: WO02/063703

PCT Pub. Date: Aug. 15, 2002

(65) Prior Publication Data
US 2004/0067376 A1    Apr. 8, 2004

(30) Foreign Application Priority Data
Feb. 6, 2001   (JP)   .............................. 2001-029518

(51) Int. Cl.
| B32B 27/32 | (2006.01) |
| B32B 17/10 | (2006.01) |
| B32B 15/04 | (2006.01) |
| H01L 35/02 | (2006.01) |

(52) U.S. Cl. ...................... 428/220; 428/332; 428/339; 428/457; 136/230

(58) Field of Classification Search ................ 428/220, 428/332, 335, 339, 457, 458, 461, 500, 515
See application file for complete search history.

(56) References Cited

U.S. PATENT DOCUMENTS 3,880,694 A * 4/1975 Freeman et al. ......... 156/331.3
4,183,772 A * 1/1980 Davis ......................... 428/472
6,248,181 B1 * 6/2001 Osako et al. ............... 148/247

FOREIGN PATENT DOCUMENTS

| EP | 0 312 309 A | 4/1989 |
| JP | 60-221952 A | 11/1985 |
| JP | 2000-215861 A | 8/2000 |
| JP | 2001-006631 | 1/2001 |
| JP | 2001-006631 A | 1/2001 |
| JP | 2001-172779 | 6/2001 |

* cited by examiner

Primary Examiner—Sheeba Ahmed
(74) Attorney, Agent, or Firm—Knobbe Martens Olson & Bear LLP

(57) ABSTRACT

The present invention relates to a laminate for battery encasement comprising aluminum foil and an inner layer, wherein a resin film layer that comprises an aminated phenol polymer (A), a trivalent chromium compound (B), and a phosphorus compound (C) lies between the aluminum foil and the inner layer. The laminate for battery encasement of the present invention is excellent in adhesiveness, gas impermeability, etc., and therefore can be suitably used as a material for encasing a secondary battery, particularly a lithium ion polymer secondary battery.

9 Claims, No Drawings

LAMINATE FOR USE IN ARMOR OF CELL, AND SECONDARY CELL

TECHNICAL FIELD

The present invention relates to a laminate for use in a battery encasement of a secondary battery, such as a lithium ion battery and the like, particularly a lithium ion polymer secondary battery using a gel electrolyte.

BACKGROUND ART

Lithium ion secondary batteries are widely used in various kinds of electronic devices and components, particularly in portable telephones, note-book personal computers, video cameras, satellites, electric motorcars, etc.

Among lithium ion secondary batteries, the lithium ion polymer secondary battery uses a gel electrolyte containing a conductive polymer or the like as its electrolyte. Compared to a lithium ion battery that uses a nonaqueous electrolyte, a lithium ion polymer secondary battery is very safe because the possibility of leakage of the electrolysis solution is low, and the lithium ion polymer secondary battery can be made smaller and lighter in weight. Therefore, the lithium ion polymer secondary battery is one of the batteries that is expected to increase its market demand.

From the viewpoint of productivity, quality stability and the like, as an encasement for lithium ion polymer secondary batteries, a metallic can of cylindrical shape, a rectangular parallelepiped shape or the like, that is obtained by press molding a metal plate, metal foil and the like is generally used.

However, when a metal can is used as an encasement for a secondary battery, the shape and design of the battery itself are subject to many restrictions and the electronic device or component that is equipped with the battery with a metal can encasement is also subject to restrictions on the shape and design of the part in which the battery is stored. This leads to the problem that the electronic devices and components cannot be formed into a desirable configuration, making it difficult to render the electronic devices and components further miniaturized and lighter in weight.

Therefore, in order to form an electronic device and component into a desired configuration and achieve further miniaturization and lightening in weight thereof, development of a battery encasement that can be readily formed into a shape that fits the shape of the electronic device or electronic component has been desired. As a metal to be used for battery encasement, aluminum foil is attracting widespread attention.

A laminate for battery encasement for use in a lithium ion polymer secondary battery should have the properties that meet the following requirements.

(1) The laminate should have a gas barrier properties that can insulate the principal part and the electrodes in the main body of the secondary battery from outside air (particularly containing water vapor) in order to avoid the undesirable phenomenon of hydrofluoric acid generated by hydrolysis of the electrolyte corroding the aluminum foil, when water vapor enters into the encasement for a secondary battery from outside.

(2) The innermost layer of the laminate should exhibit excellent adhesiveness to the metal electrodes that compose the secondary battery and excellent adhesiveness between the innermost layers.

(3) The secondary battery should have properties (heat resistance and cold resistance) resistive to the temperatures at which the battery is used, specifically, the temperature in an automobile during the summertime, in a cold district during the wintertime, etc. The temperature in the secondary battery is further increased by charging or discharging during use of the secondary battery. Even when the secondary battery is used under these severe circumstances, as a battery encasement, the laminate should have stable thermal adhesiveness, gas barrier properties, etc.

(4) The adhesive strength between layers should not be weakened by the gel electrolyte (gel electrolysis solution) that is used in the secondary battery.

(5) The laminate for battery encasement should be resistant to corrosion by hydrofluoric acid generated by deterioration, hydrolysis, or the like of the gel electrolyte used in the secondary battery.

(6) The laminate for battery encasement should have the drawability and the like to be easily shaped into a desirable shape, and be excellent in productivity.

However, a laminate for battery encasement having such excellent properties has not yet been developed.

DISCLOSURE OF THE INVENTION

One object of the present invention is to provide a laminate for the encasement of a lithium ion polymer secondary battery that has excellent gas impermeability.

Another object of the present invention is to provide a laminate for the encasement of a lithium ion polymer secondary battery wherein the adhesive strength between the layers is not substantially decreased by the gel electrolyte (gel electrolysis solution) that is used in the secondary battery.

Still another object of the present invention is to provide a laminate for use in an armor of a lithium ion polymer secondary battery that exhibits, as a material for battery encasement, stable thermal adhesiveness, gas barrier properties, etc., even when the secondary battery is used under severe conditions.

The present inventors conducted extensive research and found that, regarding a laminate for battery encasement that is formed by laminating aluminum foil and an inner layer, it is possible to obtain a desirable laminate for battery encasement by laying a specific resin film layer between the aluminum foil and the inner layer. The present invention is accomplished based on this finding.

The present invention provides a laminate for battery encasement that comprises aluminum foil and an inner layer, wherein a resin film layer comprising an aminated phenol polymer (A), a trivalent chromium compound (B), and a phosphorus compound (C) is interposed between the aluminum foil and the inner layer.

The present invention provides a laminate for battery encasement, wherein the contents of the aminated phenol polymer (A), the trivalent chromium compound (B), and the phosphorus compound (C), per 1 $m^2$ of the above resin film layer, are about 1 to 200 mg, about 0.5 to 50 mg calculated as chromium, and about 0.5 to 50 mg calculated as phosphorus, respectively.

The present invention provides a laminate for battery encasement, wherein the inner layer is composed of an olefin-based thermal adhesive resin and has a thickness of 10 to 100 μm.

The present invention provides a laminate for battery encasement, wherein the inner layer comprises two or more layers, of which the innermost layer is composed of an olefin-based thermal adhesive resin and has a thickness of about 10 to 100 μm.

The present invention provides a laminate for battery encasement, wherein the aluminum foil is a soft aluminum foil having a thickness of about 15 to 100 μm.

The present invention provides a laminate for battery encasement, wherein an outer layer is provided on the aluminum foil on the side opposite to the surface where the resin film layer is formed.

The present invention provides a laminate for battery encasement, wherein the contents of the aminated phenol polymer (A), the trivalent chromium compound (B), and the phosphorus compound (C), per 1 $m^2$ of resin film layer that lies between the outer layer and the aluminum foil, are about 1 to 200 mg, about 0.5 to 50 mg calculated as chromium, and about 0.5 to 50 mg as calculated as phosphorus, respectively.

The present invention provides a secondary battery that comprises the above-described laminate for battery encasement as the encasement thereof.

The present invention provides a lithium ion polymer secondary battery that comprises the above-described laminate for battery encasement as the encasement thereof.

The laminate for battery encasement according to the present invention comprises an aluminum foil and an inner layer, wherein a resin film layer that comprises an aminated phenol polymer (A), a trivalent chromium compound (B), and a phosphorus compound (C) lies between the inner layer and the aluminum foil.

Aluminum Foil

Aluminum foil serves as a gas barrier layer that prevents gases, such as water vapor, oxygen gas, etc., from penetrating into the battery.

From the viewpoint of reliable gas barrier properties, processability during the processing step, etc., it is preferable that the thickness of the aluminum foil be generally about 15 to 100 μm and preferably about 20 to 80 μm.

It is preferable that the aluminum foil be a soft aluminum foil.

Resin Film Layer

The resin film layer is provided in order to firmly adhere the aluminum foil to the inner layer and to protect the inner layer side of the aluminum foil from the gel electrolyte and hydrofluoric acid that is generated by deterioration or hydrolysis of the gel electrolyte.

The resin film comprises an aminated phenol polymer (A), a trivalent chromium compound (B), and a phosphorus compound (C). These three ingredients bond to each other through coordinate bonds, covalent bonds and like chemical bonds, or they strongly bond to the aluminum foil or adhere to the aluminum foil through these chemical bonds.

Particularly, when the inner layer that is adjacent to the resin film is an olefin-based heat adhesive resin layer, hydroxyl group and like polar groups in the aminated phenol polymer (A) further enhance the adhesive strength between the resin film layer and the inner layer (interlaminar strength).

The resin film layer of the present invention is hardly soluble in water, aqueous acids such as hydrofluoric acid and the like, organic solvents, etc., and exhibits excellent corrosion-resistance.

In the present invention, the above three ingredients (A) to (C) synergistically interact with each other and exhibit excellent corrosion-resistance to the gel electrolyte and deteriorated gel electrolyte, maintaining high adhesiveness of the resin film layer to the inner layer, and particularly, to an olefin-based heat adhesive resin layer.

The content of the aminated phenol polymer (A) contained in the resin film layer is suitably selected taking corrosion-resistance, press-moldability, and the like into consideration.

The content of the trivalent chromium compound (B) contained in the resin film layer is suitably selected taking the corrosion-resistance, economical efficiency, and the like into consideration.

The content of the phosphorus compound (C) contained in the resin film layer is suitably selected taking adhesiveness and the like into consideration.

In the present invention, per 1 $m^2$ of resin film layer, it is preferable that the content of the aminated phenol polymer (A) be about 1 to 200 mg, the content of the trivalent chromium compound (B) be about 0.5 to 50 mg calculated as chromium, and the content of the phosphorus compound (C) be about 0.5 to 50 mg calculated as phosphorus, and more preferably the content of the aminated phenol polymer (A) be about 5 to 150 mg, the content of the trivalent chromium compound (B) be about 1 to 40 mg calculated as chromium, and the content of the phosphorus compound (C) be about 1 to 40 mg calculated as phosphorus.

In other words, in the present invention, per 1 $m^2$ of resin film layer, it is preferable that the content of the aminated phenol polymer (A) be about 1 to 200 parts by weight, the content of the trivalent chromium compound (B) be about 0.5 to 50 parts by weight calculated as chromium, and the content of the phosphorus compound (C) be about 0.5 to 50 parts by weight calculated as phosphorus, and it is more preferable that the content of the aminated phenol polymer (A) be about 5 to 150 parts by weight, the content of the trivalent chromium compound (B) be about 1 to 40 parts by weight calculated as chromium, and the content of the phosphorus compound (C) be about 1 to 40 parts by weight calculated as phosphorus.

The above-described resin film layer is extremely thin and the film thickness thereof is generally at the nano-order level.

Aminated Phenol Polymer (A)

For the aminated phenol polymer (A), various known kinds can be used, including the aminated phenol polymers mentioned below.

(1) Aminated phenol polymers having a repeating unit represented by general formula (I),

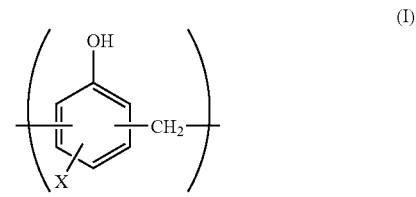

wherein X represents a hydrogen atom, hydroxyl group, alkyl group, hydroxyalkyl group, allyl group, or benzyl group; and a repeating unit represented by general formula (II),

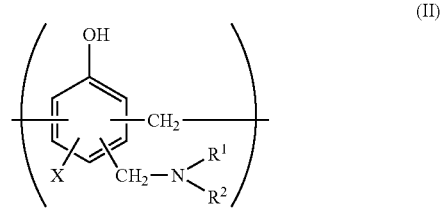

wherein X is the same as defined above and $R^1$ and $R^2$ are the same or different to each other and represent hydroxyl group, alkyl group, or hydroxyalkyl group.

(2): Aminated phenol polymers consisting of the repeating unit represented by the above general formula (II).

(3): Aminated phenol polymers having a repeating unit represented by general formula (III),

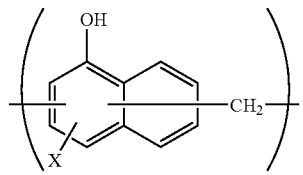

wherein X is the same as defined above; and
a repeating unit represented by general formula (IV),

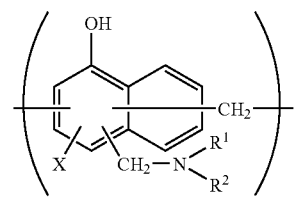

wherein X, $R^1$, and $R^2$ are the same as defined above.

(4): Aminated phenol polymers consisting of a repeating unit represented by general formula (IV).

In the above general formulae (I) to (IV), examples of alkyl groups represented by X, $R^1$, and $R^2$ include methyl group, ethyl group, n-propyl group, iso-propyl group, n-butyl group, iso-butyl group, tert-butyl group and like $C_1$ to $C_4$ straight or branched chain alkyl groups. Examples of hydroxyalkyl groups represented by X, $R^1$, and $R^2$ include hydroxymethyl group, 1-hydroxyethyl group, 2-hydroxyethyl group, 1-hydroxypropyl group, 2-hydroxypropyl group, 3-hydroxypropyl group, 1-hydroxybutyl group, 2-hydroxybutyl group, 3-hydroxybutyl group, 4-hydroxybutyl group and like $C_1$ to $C_4$ straight or branched chain alkyl groups wherein one of the hydrogen atoms is substituted by hydroxyl.

It is preferable that X represented by general formulas (I) to (IV) be a hydrogen atom, a hydroxyl group, or a hydroxyalkyl group.

It is preferable that the aminated phenol polymers mentioned in item (1) be aminated phenol polymers that contain the repeating unit that is represented by general formula (I) in content of not greater than about 80 mol. %, and more preferably polymers that contain the repeating unit represented by general formula (I) in content of about 25 to 55 mol. %.

It is preferable that the aminated phenol polymers mentioned in item (3) be aminated phenol polymers that contain the repeating unit represented by the general formula (III) in content of not greater than about 80 mol. %, and more preferably polymers those contain the repeating unit represented by the general formula (III) in content of about 25 to 55 mol. %.

The number average molecular weight of the aminated phenol polymer (A) is preferably about 500 to one million and more preferably about 1,000 to 20,000.

The aminated phenol polymers (A) are generally prepared by polycondensating a phenol compound or a naphthol compound with formaldehyde, to obtain a polymer that contains a repeating unit represented by general formula (I) or general formula (III), and then introducing a hydrophilic functional group ($-CH_2NR^1R^2$) into the resulting polymer using formaldehyde and an amine ($R^1R^2NH$).

The aminated phenol polymers (A) are used singly or by combination of two or more.

Trivalent Chromium Compound (B)

For the trivalent chromium compounds (B), various known kinds can be used, including, for example, chromium (III) nitrate, chromium (III) fluoride, chromium (III) sulfate, chromium (III) acetate, chromium (III) oxalate, chromium (III) diphosphite, chromium acetylacetonate, chromium (III) chloride, potassium chromium (III) sulfate, etc. Among those, chromium (III) nitrate, chromium (III) fluoride, etc., are preferable.

Phosphorus Compound (C)

For the phosphorus compounds, various known kinds can be used, including phosphoric acid, polyphosphoric acid and like condensed phosphoric acids and salts thereof, etc., where the examples of salts include ammonium salts, and alkali metal salts such as sodium salts, potassium salts, etc.

Formation of the Resin Film Layer

Formation of a resin film layer on the surface of the aluminum foil can be readily performed, for example, by applying an aqueous treating agent that contains an aminated phenol polymer (A), a trivalent chromium compound (B), and a phosphorus compound (C) to the aluminum foil surface, followed by drying through heating.

The aqueous treating agent is an aqueous solvent that contains an aminated phenol polymer (A), a trivalent chromium compound (B), and a phosphorus compound (C), and there is no limitation on the concentrations of these ingredients. The content of each ingredient can be suitably selected depending on the proportion thereof contained in the resin film layer that is formed in the later step. The aqueous solvent is generally water, but alcohols can be added thereto in order to control the physical properties of the aqueous treating agent. As the alcohols, various known kinds can be used, including, for example, methyl alcohol, ethyl alcohol, isopropyl alcohol, n-butyl alcohol and like $C_1$ to $C_4$ alcohols. The amount of these alcohols relative to water is generally about 20 wt. % or less and preferably about 0.5 to 10 wt. %.

It is preferable that the aqueous treating agent exhibit acidity of pH6 or lower. In order to adjust its pH, known pH adjustors can be readily used. Examples of such pH adjustors include phosphoric acid, hydrofluoric acid, nitric acid, sulfuric acid and like inorganic acids, acetic acid, succinic acid, malic acid, citric acid and like organic acids or salts thereof. Examples of salts include ammonium salts, and alkali metal salts such as sodium salts, potassium salts, etc.

The resin film layer can be formed by applying the above-mentioned aqueous treating agents to the surface of the aluminum foil by immersion method, bar coat method, roll coating method, spin coating method, spraying method, and similar application methods, and then drying by heating.

Drying by heating is conducted in order to vaporize the water content of the aqueous treating agent and to make the resulting resin film layer insoluble by accelerating the reaction among the aminated phenol polymer (A), the trivalent chromium compound (B), and the phosphorus compound (C). Examples of energy sources for drying by heating include gas, electricity, infrared rays, etc.

It is preferable that the temperature for drying by heating be in the range about 80 to 300° C. and more preferably in the range about 120 to 250° C. The duration of drying by heating can be suitably selected depending on the temperature thereof, the amount of aqueous treating agent applied, etc.

Inner Layer

The inner layer of the laminate for battery encasement of the present invention can be a single layer or a multi-layer of two or more layers. It is preferable that among the inner layers, the layer exposed to the electrolysis solution be a heat adhesive resin layer.

Forming the electrolysis solution facing inner layer from a heat adhesive resin layer is advantageous due to the following reasons: When a battery is manufactured using a laminate for the battery encasement, by thermally adhering the innermost layer to the metal electrodes that compose the battery, and by thermally adhering the innermost layers to each other, it is possible to hold the metal electrodes in a sealed system that can reliably insulate the metal electrodes from outside air (particularly, water vapor). Furthermore, the adhesive strength does not substantially decrease even when the innermost layers are in contact with the electrolysis solution for a long time. Moreover, even when the battery is stored at a high temperature, occurrence of failures such as the leakage of electrolysis solution, breakage, and the like can be prevented.

Taking the heat resistance and the like of the battery into consideration, for a resin to be used in the heat adhesive resin layer, it is preferable to use a thermal adhesive resin that has a melting point of 80° C. or higher. In addition, from the viewpoint of availability and cost, olefin-based thermal adhesive resins are preferable.

For such the olefin-based thermal adhesive resins, it is possible to use a wide variety of known examples, including low-density polyethylene, medium-density polyethylene, high-density polyethylene, linear-low-density polyethylene, ethylene-α-olefin copolymer, ethylene-acrylic acid copolymer, ethylene-methacrylic acid copolymer, ethylene-acrylic ester copolymer, ethylene-methacrylate copolymer, ethylene-vinyl acetate copolymer, ionomers, polypropylene, maleic anhydride modified polypropylene, ethylene-propylene copolymer, etc.

Among these, particularly preferable olefin-based thermal adhesive resins are polypropylene, maleic anhydride modified polypropylene, etc.

The above-mentioned olefin-based thermal adhesive resins may be undrawn olefin-based thermal adhesive resins or uniaxially or biaxially drawn olefin-based thermal adhesive resins.

The inner layer may be composed of only by a heat adhesive resin layer or by laminating a synthetic resin layer that comprises a single or two or more multiple layers onto the heat adhesive resin layer.

Examples of resins, other than the above-described olefin-based thermal adhesive resins, that may compose the synthetic resin layer include known polyester-based resins, polyamide-based resins, fluoroplastics, etc.

The synthetic resin layer can be obtained by forming the resin that composes the synthetic resin layer into a sheet either without drawing or by uniaxially or biaxially drawing, and then subjecting the resulting sheet to a known lamination method, such as dry lamination method, sand lamination method, etc., or subjecting it to extrusion using a T-die extruder. When the resin that composes the inner layer is formed into a sheet, in order to provide the surface of the sheet with wettability, it is possible to apply corona discharge treatment and/or atmospheric pressure plasma treatment and like treatments for enhancing adhesiveness on the surface that needs such treatment.

Specific formation methods of the inner layer are as follows:

1) The inner layer is formed by co-extruding maleic anhydride modified polypropylene/polypropylene onto the surface of the aluminum foil where the resin film layer is formed in such a manner that the modified polypropylene comes into contact with the resin film layer.

2) A maleic anhydride modified polypropylene solution is applied to the surface of the aluminum foil where the resin film layer is formed, and, after drying, an undrawn polypropylene film is obtained thereon by thermal lamination.

3) A maleic anhydride modified polypropylene resin is extruded between the surface of the aluminum foil where the resin film layer is formed and the undrawn polypropylene film, and the resulting layers are subjected to sand-lamination to obtain a laminate.

4) A laminate is formed by adhering the surface of the aluminum foil where the resin film layer is formed to the undrawn polypropylene film that has been subjected to corona discharge treatment using a adhesive for dry lamination.

The heat adhesive resin layer of the inner layer is used for fixing the electrodes of the battery by sealing them in without leaving space between the layer and the electrodes. When the heat adhesive resin layer is unduly thin, formation of pinholes tend to occur between the electrodes and the heat adhesive resin layer during the thermal adhering process, and this may decrease the corrosion-resistance thereof against the electrolysis solution.

When the inner layer is made of a single layer, it is preferable that the thickness of the heat adhesive resin layer that comes into contact with the electrodes be about 10 to 100 μm and more preferably about 20 to 80 μm.

When the inner layer is made of two or more multiple layers, it is preferable that the total thickness of the inner layer be about 10 to 100 μm and more preferably about 20 to 80 μm. In this case, it is preferable that the thickness of the heat adhesive resin layer be about 8 to 80 μm and more preferably about 15 to 50 μm.

A laminate having a structure in which the above-described specific resin film layer is disposed between the aluminum foil and the inner layer is satisfactorily usable as a material for encasing a secondary battery without being subject to an additional process.

Examples of the multilayer structures of the present invention are as shown below.

Aluminum foil/resin film layer/maleic anhydride modified polypropylene resin layer/polypropylene resin layer;

Aluminum foil/resin film layer/maleic anhydride modified polypropylene resin layer/undrawn polypropylene film; and Aluminum foil/resin film layer/adhesive layer/undrawn polypropylene film.

Outer Layer

By providing an outer layer on the outer side of the aluminum foil, it is possible to enhance the resistance thereof against external force, particularly against piercing, to the level comparable to that of battery encasement made from a metal can.

Similar to the inner layer, the outer layer may be a single layer or a multi-layer of two or more layers.

When the outer layer is made of a single layer, it is necessary that the outer layer achieve the above objects itself. Therefore, it is preferable that the resin that composes the outer layer have excellent mechanical strength and have dimensional stability at least to the level that can resist the heat during heat sealing. Taking these points into consideration, it is preferable that the resin that composes the outer layer be a polyester film drawn in the biaxial direction, a polyamide film drawn in the biaxial direction, etc.

Examples of such biaxially oriented polyester films include, for example, polyethylene terephthalate, polybutylene terephthalate, polyethylene naphthalate, polybutylene naphthalate, polycarbonate, etc.

Examples of such biaxially oriented polyamide films include nylon 6, nylon 6, 6, etc.

When the laminate for battery encasement of the present invention is subjected to drawing, a biaxially oriented polyamide film is preferable because it has a greater elongation than that of a biaxially oriented polyester film.

From the viewpoint of protection effectiveness for the aluminum foil, drawability, etc., when the outer layer is made from a single layer of a biaxially oriented polyester film or a biaxially oriented polyamide film, it is preferable that the thickness thereof be about 6 µm or more and more preferably from about 8 to 25 µm.

Furthermore, whether the outer layer is made from a single layer or multiple layers, it is preferable that the thickness of the outer layer be about 30 µm or less in order to make the battery light in weight.

The lamination between the outer layer and the aluminum foil can be conducted by known dry lamination methods, for example, a method using a dry lamination adhesive. In order to provide wettability to the surface of the film, it is possible to apply corona discharge treatment and/or atmospheric pressure plasma treatment and like treatments for enhancing adhesiveness to the biaxially oriented film that is used as the outer layer on the surface that needs such treatment.

If necessary, it is also possible to provide a resin film layer on the outer layer surface side of the aluminum foil as on the inner layer surface side.

The laminate of the present invention is suitably used as an armored material for a secondary battery, particularly a lithium ion polymer secondary battery.

Various known methods can be used to make the laminate of the present invention as a material for use as an armor for a secondary battery.

EFFECT OF THE INVENTION

The laminate for battery encasement of the present invention exhibits excellent gas impermeability that insulates the principal part of the main body of the secondary battery and the electrodes from outside gases (particularly water vapor gas).

The laminate for battery encasement of the present invention comprises innermost layer that exhibit excellent adhesiveness to metal electrodes of a secondary battery. Furthermore, the laminate for battery encasement of the present invention has excellent adhesiveness between the innermost layers of the encasement.

The laminate for battery encasement of the present invention maintains excellent properties, such as stable thermal adhesiveness, gas impermeability, etc., even when the battery is used under severe conditions.

The adhesive strength between layers of the laminate for battery encasement of the present invention is not substantially deteriorated by the gel electrolyte (gel electrolysis solution) used in the secondary battery.

The laminate for battery encasement of the present invention is corrosion-resistant against hydrofluoric acid generated by deterioration, hydrolysis, and the like of the gel electrolyte that is used in the secondary battery.

The laminate for battery encasement of the present invention has excellent drawability, etc., and can be readily formed into a predetermined shape, leading to excellent productivity.

BEST MODE FOR CARRYING OUT THE INVENTION

The features of the present invention will be illustrated in further detail below by referring to examples.

REFERENCE EXAMPLE (Preparation of Aqueous Treating Agents)

The ingredients contained in the aqueous treating agent are as follows:

Ingredients (A)

A-1: Aminated phenol polymer (a polymer having a number average molecular weight of 5,000 that contains 50 mol. % of repeating unit represented by general formula (I) in which X is a hydrogen atom, and 50 mol. % of repeating unit represented by general formula (II) in which X is a hydrogen atom, $R^1$ is a methyl group, and $R^2$ is a methyl group)

A-2: Aminated phenol polymer (a polymer having a number average molecular weight of 20,000 that contains 30 mol. % of repeating unit represented by general formula (I) in which X is a hydrogen atom, and 70 mol. % of repeating unit represented by general formula (II) in which X is a hydrogen atom, $R^1$ is a methyl group, and $R^2$ is a 3-hydroxypropyl group)

Ingredients (B)

B-1: chromium (III) fluoride

B-2: chromium (III) nitrate

Ingredients (C)

C-1: phosphoric acid

C-2: polyphosphoric acid

Other ingredients (D)

D-1: zirconium fluoride

D-2: chromium (VI) oxide

D-3: polyacrylic acid (number average molecular weight of 10,000)

Per one liter of water, the above ingredients each having the amount (g) as shown in Table 1 were mixed, preparing aqueous treating agents (a) to (h).

TABLE 1

| Aqueous treating agent | (a) | (b) | (c) | (d) | (e) | (f) | (g) | (h) |
|---|---|---|---|---|---|---|---|---|
| A-1 | 10 | | 10 | 10 | 10 | 10 | | |
| A-2 | | 10 | | | | | | |
| B-1 | 5 | 5 | | 10 | 20 | | 2.5 | |
| B-2 | | | 10 | | | | | 15 |
| C-1 | 20 | 20 | 20 | | 40 | 20 | 20 | 30 |
| C-2 | | | | 20 | | | | |
| D-1 | | | | | | 5 | 5 | |
| D-2 | | | | | | | 2.7 | |
| D-3 | | | | | | | | 16 |

Unit: g/l

Example 1

(1) Preparation of Aluminum Foil

An alkaline degreasing solution (2 g, product name: FC-315, manufactured by Nihon Parkerizing Co., Ltd.) was dissolved in 98 g of water to prepare an alkaline aqueous solution. The resulting alkaline aqueous solution was heated to 50° C., and soft aluminum foil (thickness 40 μm, product name: BESPA 8021, manufactured by Sumikei Aluminum-Foil Co., Ltd.) was immersed in the solution for four minutes. Thereafter, the aluminum foil was washed with water and further washed with deionized water, and then dried by hot air to obtain degreased soft aluminum foil.

(2) Formation of Resin Film Layers on Surfaces of Aluminum Foil

On both sides of the soft aluminum foil that has been subjected to degreasing treatment, aqueous treating agent (a) was applied using a roll coater in such a manner that the applied amount per each side was 2 ml/m$^2$. The aluminum foil was then dried by heating at 180° C., forming resin film layers on both surfaces of the aluminum foil.

(3) Formation of an Outer Layer

To one of the resin film layers, urethane-based dry lamination adhesive (manufactured by Toyo-Morton, Ltd., product name: AD122/CAT10) was applied to the amount of 3 g/m$^2$ on a dry basis, forming an adhesive layer. The adhesive layer was then adhered to a biaxially oriented nylon film (manufactured by Idemitsu Petrochemical Co., Ltd., product name: G-100) having a thickness of 25 μm on a surface that had been previously subjected to corona discharge treatment, thereby forming an outer layer on the resin film layer.

(4) Formation of an Inner Layer

To the other resin film layer, urethane-based dry lamination adhesive (manufactured by Toyo-Morton, Ltd., product name: AD-503/CAT10) was applied to the amount of 3 g/m$^2$ on a dry basis, forming an adhesive layer. The adhesive layer was then adhered to an undrawn polypropylene film (manufactured by Futamura Chemical Industries Co., Ltd., product name: FCZX) having a thickness of 30 μm on a surface that had been previously subjected to corona discharge treatment, forming a laminate for battery encasement of the present invention.

Example 2

Preparation of the aluminum foil, and formation of a resin film layer on the surface of the aluminum foil and the outer layer were conducted in the same manner as in Example 1. Formation of an inner layer was then conducted in the following manner:

On the inner resin film layer, maleic anhydride modified polypropylene was extruded using a T-die extruder in such a manner that the thickness thereof was 15 μm, and an undrawn polypropylene film (manufactured by Futamura Chemical Industries Co., Ltd., product name: FCZK) having a thickness of 30 μm was subjected to sand lamination, forming a laminate for battery encasement of the present invention.

Example 3

A laminate for battery encasement of the present invention was formed in the same manner as in Example 2 except that resin film layers were formed on both surfaces of the aluminum foil using aqueous treating agent (b) instead of aqueous treating agent (a).

Example 4

A laminate for battery encasement of the present invention was formed in the same manner as in Example 2 except that resin-film layers were formed on both surfaces of the aluminum foil using aqueous treating agent (c) instead of aqueous treating agent (a).

Example 5

A laminate for battery encasement of the present invention was formed in the same manner as in Example 2 except that resin film layers were formed on both surfaces of the aluminum foil using aqueous treating agent (d) instead of aqueous treating agent (a).

Example 6

A laminate for battery encasement of the present invention was formed in the same manner as in Example 2 except that resin film layers were formed on both surfaces of the aluminum foil using aqueous treating agent (e) instead of aqueous treating agent (a).

Comparative Example 1

A laminate for battery encasement was formed in the same manner as in Example 1 except that resin film layers were formed on both surfaces of the aluminum foil using aqueous treating agent (f) instead of aqueous treating agent (a).

Comparative Example 2

A laminate for battery encasement was formed in the same manner as in Example 2 except that resin film layers were formed on both surfaces of the aluminum foil using aqueous treating agent (f) instead of aqueous treating agent (a).

Comparative Example 3

A laminate for battery encasement was formed in the same manner as in Example 2 except that resin film layers were formed on both surfaces of the aluminum foil using aqueous treating agent (g) instead of aqueous treating agent (a).

Comparative Example 4

A laminate for battery encasement was formed in the same manner as in Example 2 except that resin film layers were formed on both surfaces of the aluminum foil using aqueous treating agent (h) instead of aqueous treating agent (a).

The proportions of ingredients in the resin film layers obtained in Examples 1 to 6 and Comparative Examples 1 to 4 were evaluated in the following manner:

The amount of carbon contained in 1 m$^2$ of resin film when the resin film layer was formed on the aluminum foil was measured using a total organic carbon meter (manufactured by Shimadzu Corporation, TOC-5000A), and the value obtained by multiplying the measured carbon value by the coefficients shown below was defined as the content of (A).

The coefficient was defined as the value obtained by dividing the weight of polymer (A) by the weight of carbon contained in polymer (A), with the coefficients being determined by the type of polymer. The coefficient used for A-1 was 1.3 and that of A-2 was 1.4.

The contents of (B) (content of chromium) and (C) (content of phosphorus) per 1 m² of resin film when the resin film layer was formed on the aluminum foil were measured using a fluorescent X-ray spectrometer (manufactured by Shimadzu Corporation, LAB CENTER XRF-1700).

As for (B), the contents of (D-1) and (D-2) per 1 m² of resin film were measured using a fluorescent X-ray spectrometer (manufactured by Shimadzu Corporation, LAB CENTER XRF-1700). The content of (D-1) in the resin film of Comparative Example 2 was 10 mg/m².

The content of (D-3) per 1 m² of resin film was measured by following the same process for measuring the content of (A). The coefficient of D-3 used was 2.0. The content of (D-3) in the resin film of Comparative Example 5 was 67 mg/m².

The measurement results are shown in Table 2. The values shown in Table 2 are the contents of each ingredient in a single resin film layer formed on the aluminum foil.

TABLE 2

| | Resin film layer | | |
|---|---|---|---|
| | Content of aminated phenol polymer | Content of chromium compound (calculated as cr) | Content of phosphorus compound (calculated as P) |
| Example 1 | 42 | 10 | 27 |
| Example 2 | 42 | 10 | 27 |
| Example 3 | 42 | 10 | 27 |
| Example 4 | 42 | 10 | 27 |
| Example 5 | 42 | 10 | 37 |
| Example 6 | 84 | 20 | 54 |
| Comp. Example 1 | 42 | 0 | 27 |
| Comp. Example 2 | 42 | 0 | 27 |
| Comp. Example 3 | 0 | 11 | 27 |
| Comp. Example 4 | 0 | 14 | 40 |

Unit: mg/m²

The laminates for battery encasement prepared in Examples 1 to 6 and Comparative Examples 1 to 4 were immersed in an electrolysis solution (prepared by dissolving lithium phosphate hexafluoride in ethylene carbonate to obtain a one molar lithium phosphate hexafluoride solution) at a temperature of 85° C. The adhesive strengths of the aluminum foil against a maleic anhydride modified polypropylene film or an undrawn polypropylene film were then evaluated after 3 days, 5 days, 7 days, 10 days, and 14 days from the start of immersion. Table 3 shows the results.

As the criteria of the evaluation, a laminate in which the aluminum foil could not be separated from the maleic anhydride modified polypropylene film or undrawn polypropylene film was evaluated as an excellent laminate and expressed as A in the table, a laminate in which the aluminum foil could be separated but had not yet separated was evaluated as a fair laminate and expressed as B, and a laminate in which the aluminum foil and the maleic anhydride modified polypropylene film or undrawn polypropylene film were separated from each other was evaluated as a defective laminate and expressed as C.

TABLE 3

| | Evaluation of adhesive strength | | | | |
|---|---|---|---|---|---|
| | after 3 days | after 5 days | after 7 days | after 10 days | after 14 days |
| Example 1 | B | B | B | B | B |
| Example 2 | A | A | A | A | A |
| Example 3 | A | A | A | A | A |
| Example 4 | A | A | A | A | A |
| Example 5 | A | A | A | A | A |
| Example 6 | A | A | A | A | A |
| Comp. Example 1 | B | C | C | C | C |
| Comp. Example 2 | B | B | C | C | C |
| Comp. Example 3 | B | B | B | B | C |
| Comp. Example 4 | B | C | C | C | C |

As is clear from Table 3, in the laminate for battery encasement of the present invention, separation of aluminum foil from the maleic anhydride modified polypropylene film or undrawn polypropylene film does not occur with the passage of the time. Therefore, the laminate for battery encasement of the present invention shows excellent corrosion-resistance against the electrolysis solution.

The invention claimed is:

1. A laminate for battery encasement comprising aluminum foil and an inner layer, in which a resin film layer that comprises an aminated phenol polymer (A), a trivalent chromium compound (B), and a phosphorus compound (C) lies between the aluminum foil and the inner layer, wherein the contents of the aminated phenol polymer (A), trivalent chromium compound (B), and phosphorus compound (C), per 1 m² of the resin film layer, are about 1 to 200 mg, about 0.5 to 50 mg calculated as chromium, and about 0.5 to 50 mg calculated as phosphorus, respectively.

2. A laminate for battery encasement according to claim 1, wherein the inner layer comprises an olefin-containing thermal adhesive resin and has a thickness of 10 to 100 μm.

3. A laminate for battery encasement according to claim 1, wherein the inner layer comprises two or more layers, of which the innermost layer comprises an olefin-containing thermal adhesive resin and has a thickness of about 10 to 100 μm.

4. A laminate for battery encasement according to claim 1, wherein the aluminum foil has a thickness of about 15 to 100 μm.

5. A laminate for battery encasement according to claim 1, wherein an outer layer is provided on the aluminum foil on the side opposite to the surface where the resin film layer is formed.

6. A laminate for battery encasement according to claim 5, wherein a resin film layer that contains an aminated phenol polymer (A), a trivalent chromium compound (B), and a phosphorus compound (C) lies between the outer layer and the aluminum foil.

7. A laminate for battery encasement according to claim 6, wherein the contents of the aminated phenol polymer (A), trivalent chromium compound (B), and phosphorus compound (C), per 1 m² of resin film layer between the outer layer and the aluminum foil, are about 1 to 200 mg, about 0.5 to 50 mg calculated as chromium, and about 0.5 to 50 mg calculated as phosphorus, respectively.

8. A secondary battery comprising a battery encasement made of the laminate of claim 1.

9. A secondary battery according to claim 8, wherein the secondary battery is a lithium ion polymer secondary battery.

* * * * *